United States Patent
Onishi et al.

(10) Patent No.: US 12,074,507 B2
(45) Date of Patent: Aug. 27, 2024

(54) ROTARY ELECTRIC MACHINE

(71) Applicant: Mitsubishi Electric Corporation, Tokyo (JP)

(72) Inventors: Yoshihiko Onishi, Tokyo (JP); Isao Sonoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 17/789,675

(22) PCT Filed: Apr. 16, 2020

(86) PCT No.: PCT/JP2020/016670
§ 371 (c)(1),
(2) Date: Jun. 28, 2022

(87) PCT Pub. No.: WO2021/210117
PCT Pub. Date: Oct. 21, 2021

(65) Prior Publication Data
US 2023/0034461 A1 Feb. 2, 2023

(51) Int. Cl.
H02K 9/22 (2006.01)
H02K 5/136 (2006.01)
H02K 11/33 (2016.01)

(52) U.S. Cl.
CPC ............. *H02K 9/227* (2021.01); *H02K 5/136* (2013.01); *H02K 11/33* (2016.01); *H02K 2211/03* (2013.01)

(58) Field of Classification Search
CPC ........ H02K 5/136; H02K 9/227; H02K 11/33; H02K 2211/03; H02K 2213/06
See application file for complete search history.

(56) References Cited

U.S. PATENT DOCUMENTS

| | | |
|---|---|---|
| 2014/0035445 A1 | 2/2014 | Uryu et al. |
| 2016/0036304 A1 | 2/2016 | Yamasaki et al. |
| 2019/0173350 A1 | 6/2019 | Kodama et al. |
| 2019/0207488 A1 | 7/2019 | Ichikawa et al. |
| 2019/0267862 A1 | 8/2019 | Hattori et al. |

(Continued)

FOREIGN PATENT DOCUMENTS

| | | |
|---|---|---|
| JP | 2014-033541 A | 2/2014 |
| JP | 2014-72316 A | 4/2014 |

(Continued)

OTHER PUBLICATIONS

Extended European Search Report dated May 3, 2023 in European Application No. 20931076.2.

(Continued)

*Primary Examiner* — Mohamad A Musleh
(74) *Attorney, Agent, or Firm* — Sughrue Mion, PLLC; Richard C. Turner

(57) ABSTRACT

A rotary electric machine in which a capacitor does not explode even if heat is generated in the capacitor, is provided. A heat sink includes a recess-shaped capacitor housing portion having an inner peripheral side surface joined to an outer peripheral side surface of a capacitor via a capacitor heat dissipation material, and the capacitor housing portion includes an explosion-proof valve recess located at a position facing an explosion-proof valve of the capacitor, and a communication passage providing communication between a drive circuit board and the explosion-proof valve.

13 Claims, 9 Drawing Sheets

(56) References Cited

U.S. PATENT DOCUMENTS

| | | |
|---|---|---|
| 2019/0273416 A1 | 9/2019 | Kizu et al. |
| 2019/0280566 A1 | 9/2019 | Hattori et al. |
| 2019/0280567 A1 | 9/2019 | Hattori et al. |
| 2019/0283798 A1 | 9/2019 | Hattori et al. |
| 2019/0319516 A1 | 10/2019 | Kizu et al. |
| 2019/0319517 A1 | 10/2019 | Hattori et al. |
| 2019/0348885 A1 | 11/2019 | Hattori et al. |
| 2020/0014273 A1 | 1/2020 | Ogawa et al. |
| 2020/0059141 A1 | 2/2020 | Okamoto et al. |
| 2020/0062295 A1 | 2/2020 | Hattori et al. |
| 2020/0195098 A1 | 6/2020 | Shimakawa et al. |

FOREIGN PATENT DOCUMENTS

| | | |
|---|---|---|
| JP | 2016-182031 A | 10/2016 |
| JP | 6172217 B2 | 8/2017 |
| WO | 2018/029894 A1 | 2/2018 |
| WO | 2018/047342 A1 | 3/2018 |
| WO | 2018/221726 A1 | 12/2018 |
| WO | 2019/064896 A1 | 4/2019 |
| WO | 2019/064897 A1 | 4/2019 |

OTHER PUBLICATIONS

International Search Report issued Jun. 23, 2020 in International Application No. PCT/JP2020/016670.
Office Action issued Jul. 4, 2023 in Japanese Application No. 2022-514939.

ROTARY ELECTRIC MACHINE

CROSS REFERENCE TO RELATED APPLICATIONS

This application is a National Stage of International Application No. PCT/JP2020/016670 filed Apr. 16, 2020.

TECHNICAL FIELD

The present disclosure relates to a rotary electric machine.

BACKGROUND ART

In a rotary electric machine, heat is generated in a switching element, a choke coil, and a capacitor, and thus the heat is dissipated to a heat sink via a heat dissipation material. In particular, for dissipating the heat in the capacitor, an explosion-proof valve is sealed so as to be surrounded in a ring shape by a sealing member, and a heat dissipation material is disposed outside the space where the explosion-proof valve is sealed, thereby dissipating the heat (see, for example, Patent Document 1).

CITATION LIST

Patent Document

Patent Document 1: WO2019/064897

SUMMARY OF THE INVENTION

Problems to be Solved by the Invention

In the conventional rotary electric machine, the explosion-proof valve is sealed so as to be surrounded in a ring shape by the sealing member. Therefore, if heat is generated at a very high temperature in the capacitor due to reverse connection of a power supply or the like, when an electrolyte leaks from the explosion-proof valve into the space sealed by the sealing member and vaporizes due to further heat generation, the pressure of the sealed space rises, causing a problem that the capacitor explodes.

The present disclosure has been made to solve the above problem, and an object of the present disclosure is to provide a rotary electric machine in which a capacitor does not explode even if heat is generated at a very high temperature in the capacitor.

Solution to the Problems

A rotary electric machine according to the present disclosure is a rotary electric machine wherein: a control unit includes a switching element, a capacitor, a choke coil, and a heat sink; the switching element is joined to the heat sink via a switching element heat dissipation material; the heat sink includes a recess-shaped choke coil housing portion having a bottom surface joined to an upper surface of the choke coil via a choke coil heat dissipation material, and a recess-shaped capacitor housing portion having an inner peripheral side surface joined to an outer peripheral side surface of the capacitor via a capacitor heat dissipation material; and the capacitor housing portion includes an explosion-proof valve recess located at a position facing an explosion-proof valve of the capacitor, and a communication passage providing communication between a drive circuit board and the explosion-proof valve.

Effect of the Invention

In the rotary electric machine according to the present disclosure, the recess-shaped capacitor housing portion having an inner peripheral side surface joined to the outer peripheral side surface of the capacitor via the capacitor heat dissipation material is included, and the capacitor housing portion includes an explosion-proof valve recess located at a position facing the explosion-proof valve of the capacitor and a communication passage providing communication between the drive circuit board and the explosion-proof valve. Therefore, even if heat is generated at a very high temperature in the capacitor, the heat can be dissipated to the heat sink without causing the capacitor to explode.

DESCRIPTION OF EMBODIMENTS

Figure 1:
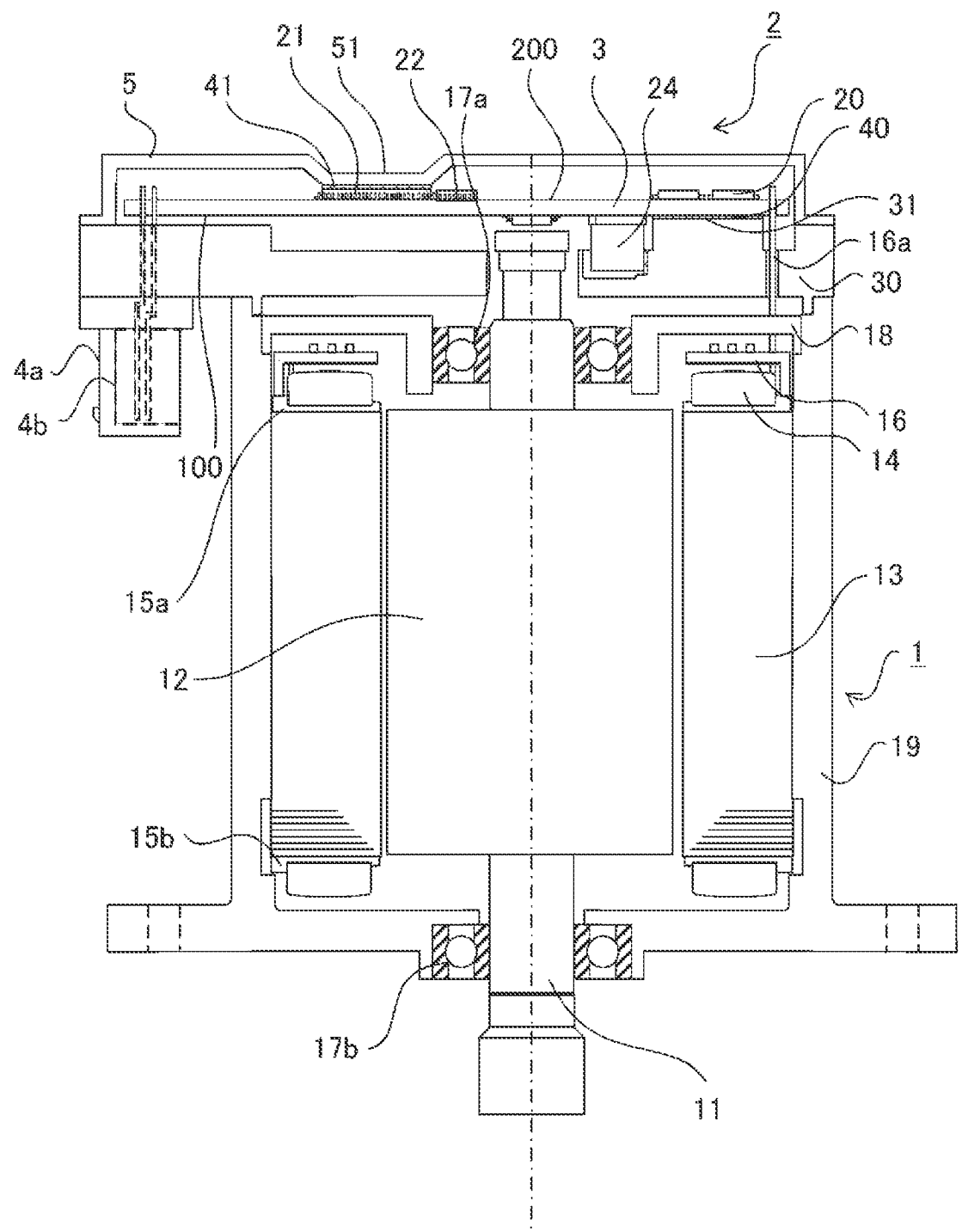
FIG. 1 is a cross-sectional view showing the configuration of a rotary electric machine according to Embodiment 1.

Hereinafter, rotary electric machines according to embodiments for carrying out the present disclosure will be described in detail with reference to the drawings. In the drawings, the same or corresponding parts are denoted by the same reference characters.

Embodiment 1

As a rotary electric machine, for example, there is an inner rotor type generator or a motor, but a description will be given with a motor as an example in Embodiment 1. FIG. 1 is a cross-sectional view showing the configuration of a rotary electric machine according to Embodiment 1. FIG. 1 is a cross-sectional view of the rotary electric machine with a motor as an example, and the rotary electric machine includes a control unit 2 and a motor 1 having a multi-phase winding.

The motor 1 includes a rotation shaft 11 which is an output shaft, a rotor 12, and a stator 13 therein. In FIG. 1, the output side of the rotation shaft 11 is in the downward direction in the drawing. A plurality of pairs of permanent magnets are provided around the rotor 12, and a multi-phase winding 14 is wound on bobbins 15a and 15b at the stator 13. An annular terminal portion 16 which connects an end portion of the winding 14 to the control unit 2 is disposed on an upper portion of the winding 14. A bearing 17a is located on an upper portion of the rotation shaft 11 at the center of a housing 18. A bearing 17b is located on a lower portion of the rotation shaft 11. The rotation shaft 11, the rotor 12, the stator 13, the winding 14, the bobbins 15a and 15b, the annular terminal portion 16, and the bearings 17a and 17b are provided in a case 19, and the housing 18 serves as a lid, so that the motor 1 is formed as a whole.

Meanwhile, the control unit 2 is disposed on the side opposite to the output side of the rotation shaft 11 of the motor 1, and includes a drive circuit board 3 covered with a cover 5. The drive circuit board 3 includes a control circuit and a power circuit, and a connector 4a and a connector 4b are connected to an end portion of the drive circuit board 3. The connectors 4a and 4b each include a terminal to which power and information are inputted, and the terminal is electrically connected to the drive circuit board 3 which includes the control circuit and the power circuit. A terminal portion 16a connected to the annular terminal portion 16 of the motor 1 is connected to the power circuit of the drive circuit board 3. A current is supplied from the power circuit to the winding 14, and the rotation shaft 11 rotates accordingly.

The drive circuit board 3 and a heat sink 30 made of aluminum are provided with a predetermined interval provided therebetween for ensuring insulation. In the drive circuit board 3, a switching element heat dissipation material 40 is provided on a surface opposite to a surface on which switching elements 20 are mounted, with a copper material having good thermal conductivity therebetween. The switching element heat dissipation material 40 is in contact with a contact surface 31 of the heat sink 30. Accordingly, the switching elements 20 are joined to the heat sink 30 via the drive circuit board 3, the copper material, and the switching element heat dissipation material 40. The switching element heat dissipation material 40 is provided on the back side of a portion of the drive circuit board 3 on which the switching elements 20 are mounted.

In the drive circuit board 3, a CPU 21 and an IC 22 are mounted on the surface on which the switching elements 20 are mounted. The cover 5 includes a projection 51 at a position facing the CPU 21, and is joined to the CPU 21 via a CPU heat dissipation material 41. Accordingly, heat generated in the CPU 21 can be dissipated to the cover 5. The projection 51 may be provided at a position facing both the CPU 21 and the IC 22 and may be joined to the CPU 21 and the IC 22 via the CPU heat dissipation material 41. In this case, heat generated in both the CPU 21 and the IC 22 can be dissipated to the cover 5.

Figure 2:
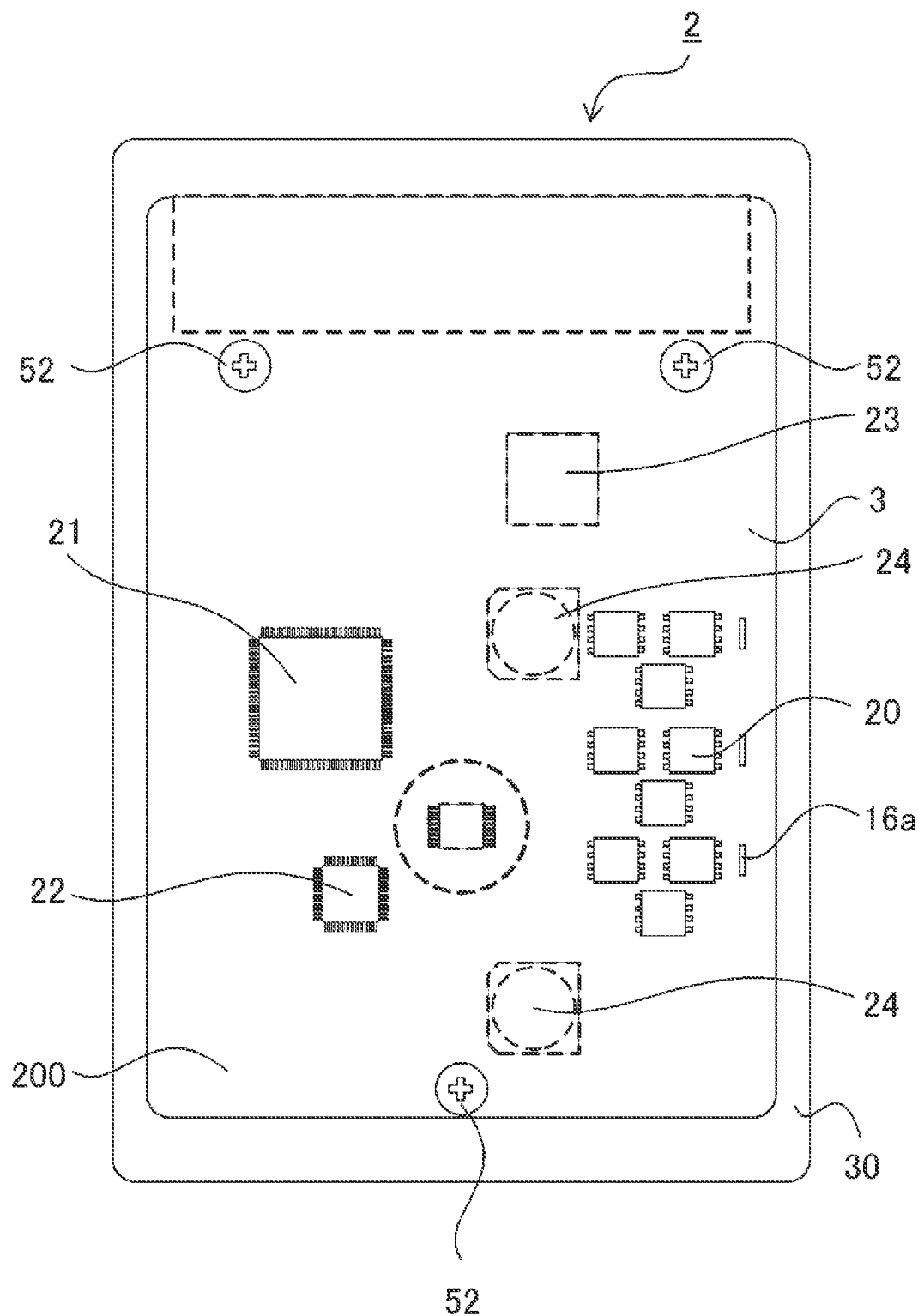
FIG. 2 is a plan view of a control unit of the rotary electric machine according to Embodiment 1 as viewed from a direction opposite to a motor.

FIG. 2 is a plan view of the control unit 2 in the rotary electric machine according to Embodiment 1 as viewed from the direction opposite to the motor 1. In FIG. 2, the connectors 4a and 4b and the cover 5 are not shown. In the drive circuit board 3, the control circuit includes the CPU 21 and the IC 22, and the power circuit includes the switching elements 20, a choke coil 23, and a capacitor 24. The choke coil 23 and the capacitor 24 are mounted on a capacitor mounting surface 100 which is a surface, of the drive circuit board 3, facing the heat sink 30, and the switching elements 20 are mounted on a switching element mounting surface 200 which is on the back side of the capacitor mounting surface 100. The drive circuit board 3 is fixed to the heat sink 30 by a plurality of screws 52.

Figure 3:
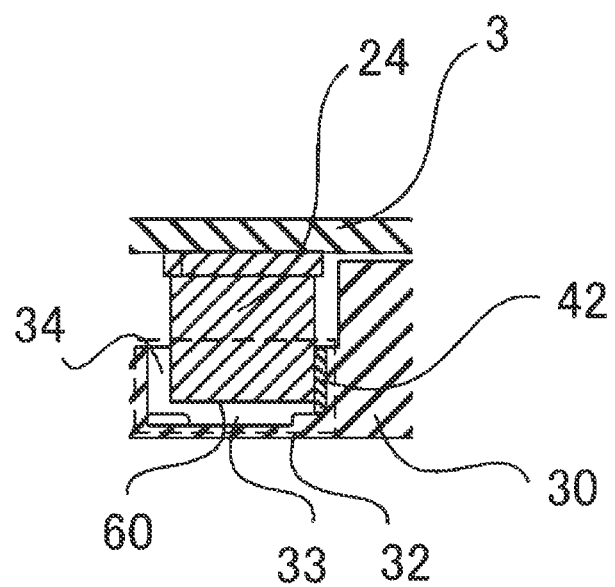
FIG. 3 is a cross-sectional view of a capacitor provided in the rotary electric machine according to Embodiment 1.
Figure 4:
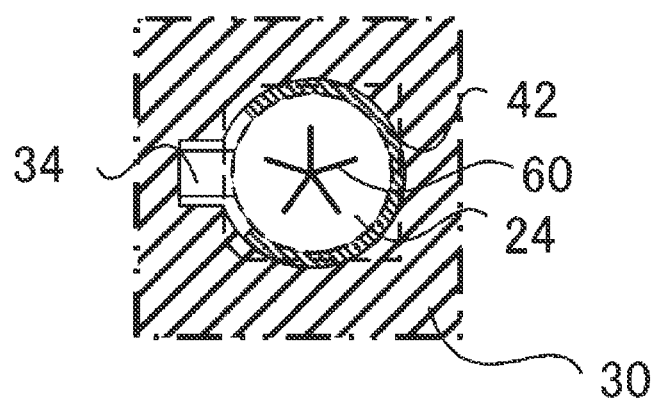
FIG. 4 is a plan view of the capacitor of the rotary electric machine according to Embodiment 1 as viewed from the direction of the motor.

FIG. 3 is a cross-sectional view of the capacitor 24 provided in the rotary electric machine according to Embodiment 1, and FIG. 4 is a plan view of the capacitor 24 in the rotary electric machine according to Embodiment 1 as viewed from the direction of the motor 1. The capacitor 24 has an explosion-proof valve 60 on an upper surface thereof. The size of the explosion-proof valve 60 is smaller than that of the upper surface of the capacitor 24. On the upper surface of the heat sink 30 in FIG. 3, a recess-shaped capacitor housing portion 32 is provided at a position facing the capacitor 24, with a predetermined gap between the capacitor 24 and the capacitor housing portion 32. The outer peripheral side surface of the capacitor 24 and the upper surface of the capacitor 24 on the outer peripheral side with respect to the explosion-proof valve 60 are joined to the inner peripheral side surface of the capacitor housing portion 32 and the bottom surface of the capacitor housing portion 32 on the outer peripheral side with respect to the explosion-proof valve 60 via a capacitor heat dissipation material 42. The capacitor heat dissipation material 42 is preferably provided on a surface having a small gap variation and a large surface area.

The capacitor housing portion 32 of the heat sink 30 includes an explosion-proof valve recess 33 at a position facing the explosion-proof valve 60 of the capacitor 24. The size of the explosion-proof valve recess 33 is about the size of the upper surface of the capacitor 24 or about the size of the explosion-proof valve 60. Accordingly, when the capacitor heat dissipation material 42 is applied to the inner peripheral side surface of the capacitor housing portion 32 of the heat sink 30 and the capacitor 24 is inserted thereinto, the explosion-proof valve 60 can be prevented from being covered with the capacitor heat dissipation material 42. Furthermore, a communication passage 34 is provided on a side surface on the rotation shaft 11 side of the capacitor housing portion 32 so as to provide communication between the drive circuit board 3 and the explosion-proof valve 60. Accordingly, for example, even if heat is generated at a very high temperature in the capacitor 24 due to reverse connection of a power supply or the like, an electrolyte leaks from the explosion-proof valve 60, and then the electrolyte vaporizes due to further heat generation, the vaporized electrolyte is discharged in the direction toward the drive circuit board 3 through the communication passage 34, and the pressure inside the capacitor 24 does not rise, so that the capacitor 24 can be prevented from exploding.

Figure 5:
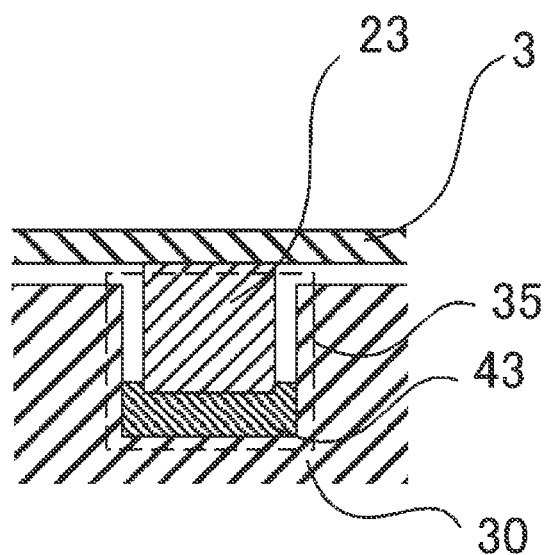
FIG. 5 is a cross-sectional view of a choke coil provided in the rotary electric machine according to Embodiment 1.

FIG. 5 is a cross-sectional view of the choke coil 23 provided in the rotary electric machine according to Embodiment 1. On the upper surface of the heat sink 30, a choke coil housing portion 35 is provided at a position facing the choke coil 23, with a predetermined gap between the choke coil 23 and the choke coil housing portion 35, and the upper surface of the choke coil 23 and the bottom surface of the choke coil housing portion 35 are joined to each other via a choke coil heat dissipation material 43. The choke coil heat dissipation material 43 is preferably provided on a surface having a small gap variation and a large surface area.

For the switching element heat dissipation material 40 provided between the copper material and the heat sink 30 on the surface on the back side of the switching elements 20, a material that prioritizes heat dissipation is preferably used. In addition, for the capacitor heat dissipation material 42 between the capacitor 24 and the heat sink 30 and the choke coil heat dissipation material 43 between the choke coil 23 and the heat sink 30, a material having elasticity in order to ensure vibration isolation is preferably used. Therefore, different materials are used for the switching element heat dissipation material 40 and for the capacitor heat dissipation material 42 and the choke coil heat dissipation material 43.

In the control unit 2, the capacitor 24 is disposed near a center portion, of the control unit 2, which is close to the rotation shaft 11, and the switching elements 20 are disposed in a peripheral portion, of the control unit 2, which is far from the rotation shaft 11, and the choke coil 23 is disposed at a position close to the connectors 4a and 4b. That is, in the heat sink 30, the capacitor housing portion 32 is located at a position closer to a center portion of the heat sink 30 than to the contact surface 31 which is in contact with the switching element heat dissipation material 40, and the choke coil housing portion 35 is located at a position close to the connectors 4a and 4b. Accordingly, the heat dissipation performance of the heat sink 30 can be improved.

When fixing the drive circuit board 3 to the heat sink 30 by the screws 52, if the gap between the heat dissipation surfaces of the switching elements 20 and the heat sink 30 is decreased, the heat dissipation is improved, but the heat dissipation surfaces and the heat sink 30 have to be prevented from being in contact with each other. In the control unit 2 according to Embodiment 1, the switching elements 20 are joined to the heat sink 30 via the drive circuit board 3, the copper material, and the switching element heat dissipation material 40, and further, the switching elements 20 are disposed outside a region surrounded by the plurality of screws 52, on the drive circuit board 3. Accordingly, when tightening the screws 52, the switching element heat dissipation material 40 located outside the region surrounded by the plurality of screws 52 on the drive circuit board 3 is pressed and spread, and the drive circuit board 3 is warped such that the gap between the heat dissipation surfaces and the heat sink 30 is widened. Therefore, stable heat dissipation can be ensured.

As described above, in the rotary electric machine according to Embodiment 1, the switching elements 20 are joined to the heat sink 30 via the switching element heat dissipation material 40, the heat sink 30 includes the recess-shaped choke coil housing portion 35 having a bottom surface joined to the upper surface of the choke coil 23 via the choke coil heat dissipation material 43, and the recess-shaped capacitor housing portion 32 having an inner peripheral side surface joined to the outer peripheral side surface of the capacitor 24 via the capacitor heat dissipation material 42, and the capacitor housing portion 32 includes the explosion-proof valve recess 33 located at a position facing the explosion-proof valve 60 of the capacitor 24, and the communication passage 34 providing communication between the drive circuit board 3 and the explosion-proof valve 60. Therefore, the capacitor 24 does not explode even if heat is generated at a very high temperature in the capacitor 24.

Embodiment 2

Figure 6:
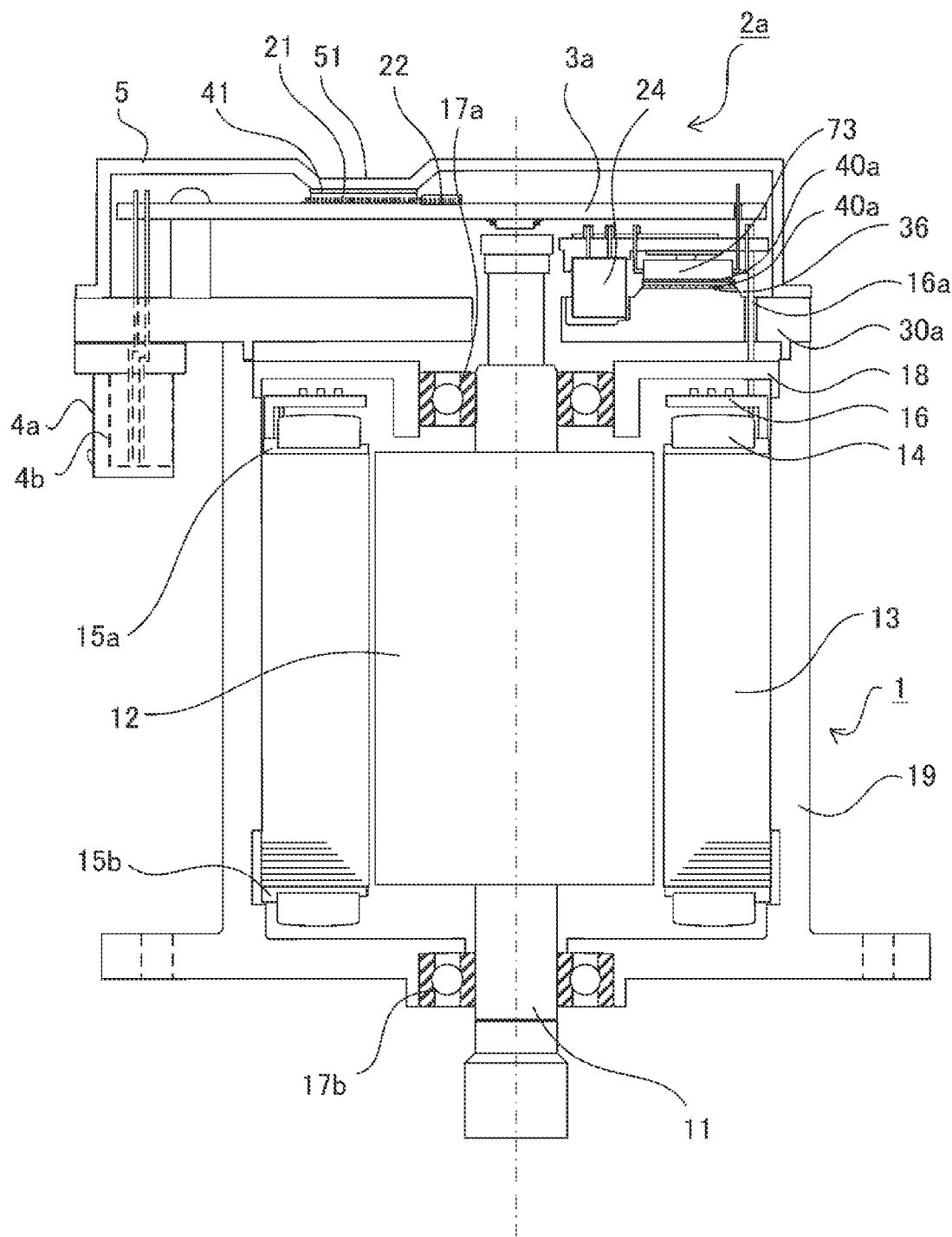
FIG. 6 is a cross-sectional view showing the configuration of a rotary electric machine according to Embodiment 2.
Figure 7:
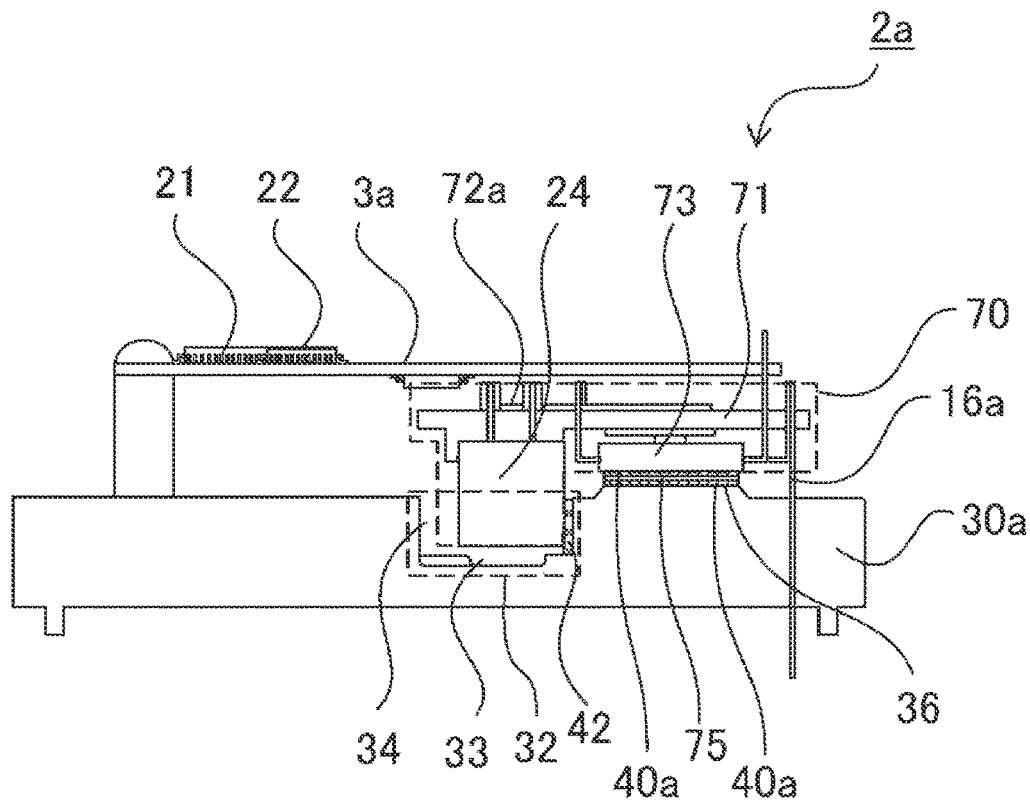
FIG. 7 is a cross-sectional view of a control unit of the rotary electric machine according to Embodiment 2.

FIG. 6 is a cross-sectional view showing the configuration of a rotary electric machine according to Embodiment 2. When the configuration of the rotary electric machine according to Embodiment 2 is compared with that of the rotary electric machine according to Embodiment 1, the configuration of the control unit is different. FIG. 7 is a cross-sectional view of a control unit 2a in Embodiment 2. In FIG. 7, connectors 4a and 4b and a cover 5 are not shown. Whereas the control unit 2 according to Embodiment 1 includes the drive circuit board 3 and the heat sink 30, the control unit 2a according to Embodiment 2 includes a drive circuit board 3a, a power unit 70, and a heat sink 30a. The drive circuit board 3a includes a CPU 21 and an IC 22, which is the same as in Embodiment 1. Power and information inputted through the connectors 4a and 4b are sent to the drive circuit board 3a and the power unit 70 through a terminal. A terminal portion 16a of a motor 1 is connected to the power unit 70. A current is supplied from the power unit 70 to a winding 14, and a rotation shaft 11 rotates accordingly.

Figure 8:
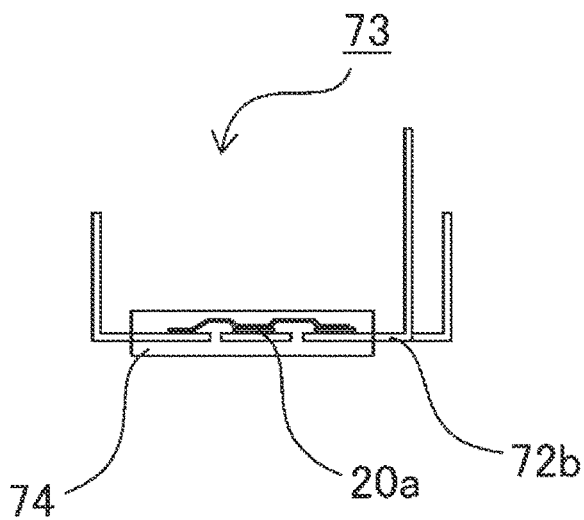
FIG. 8 is a cross-sectional view showing the configuration of a power module of the rotary electric machine according to Embodiment 2.

The power unit 70 includes a frame 71 made of a resin, a choke coil 23 and a capacitor 24 which are welded and fixed to the frame 71 via a terminal 72a made of copper, and a power module 73. FIG. 8 is a cross-sectional view showing the configuration of the power module 73. The power module 73 is formed by joining a plurality of switching elements 20a to a terminal 72b and molding with a resin 74.

In FIG. 7, the power module 73 including the switching elements 20a is joined to a contact surface 36 of the heat sink 30a via a switching element heat dissipation material 40a and an insulating member 75. On the upper surface of the heat sink 30a, a recess-shaped capacitor housing portion 32 is located at a position facing the capacitor 24, and the outer peripheral side surface of the capacitor 24 and the upper surface of the capacitor 24 on the outer peripheral side with respect to an explosion-proof valve 60 are joined to the inner peripheral side surface of the capacitor housing portion 32 and the bottom surface of the capacitor housing portion 32 on the outer peripheral side with respect to the explosion-proof valve 60 via a capacitor heat dissipation material 42, which is the same as in Embodiment 1. In addition, an explosion-proof valve recess 33 is located at a position facing the explosion-proof valve 60 of the capacitor 24, and a communication passage 34 is provided so as to provide communication between the drive circuit board 3a and the explosion-proof valve 60, which is also the same as in Embodiment 1.

Figure 9:
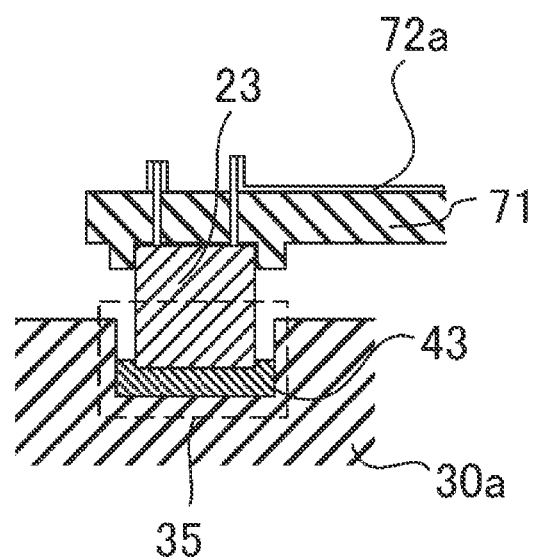
FIG. 9 is a cross-sectional view of a choke coil provided in the rotary electric machine according to Embodiment 2.

FIG. 9 is a cross-sectional view of the choke coil 23 provided in the rotary electric machine according to Embodiment 2. On the upper surface of the heat sink 30a, a choke coil housing portion 35 is provided at a position facing the choke coil 23, and the upper surface of the choke coil 23 and the bottom surface of the choke coil housing portion 35 are joined to each other via a choke coil heat dissipation material 43, which is the same as in Embodiment 1.

Figure 10:
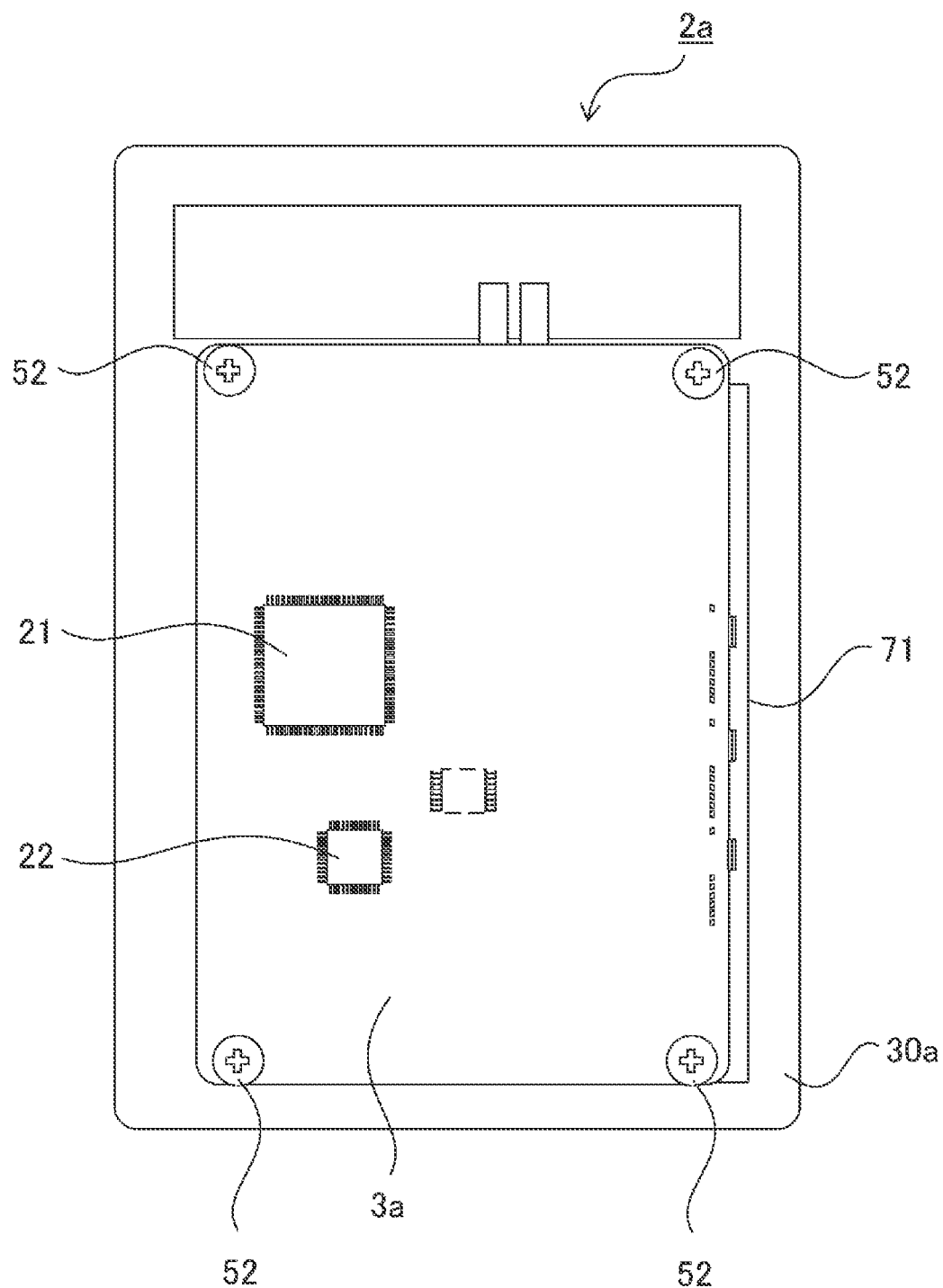
FIG. 10 is a plan view of the control unit of the rotary electric machine according to Embodiment 2 as viewed from a direction opposite to a motor.

FIG. 10 is a plan view of the control unit 2a in the rotary electric machine according to Embodiment 2 as viewed from the direction opposite to the motor 1. In FIG. 10, the connectors 4a and 4b and the cover 5 are not shown. The drive circuit board 3a and the heat sink 30a made of aluminum are provided with a predetermined interval provided therebetween for ensuring insulation, and the drive circuit board 3a is fixed to the heat sink 30a by a plurality of screws 52, which is the same as in Embodiment 1. The CPU 21 and the IC 22 are mounted on the surface of the drive circuit board 3a on the side opposite to the motor 1.

Figure 11:
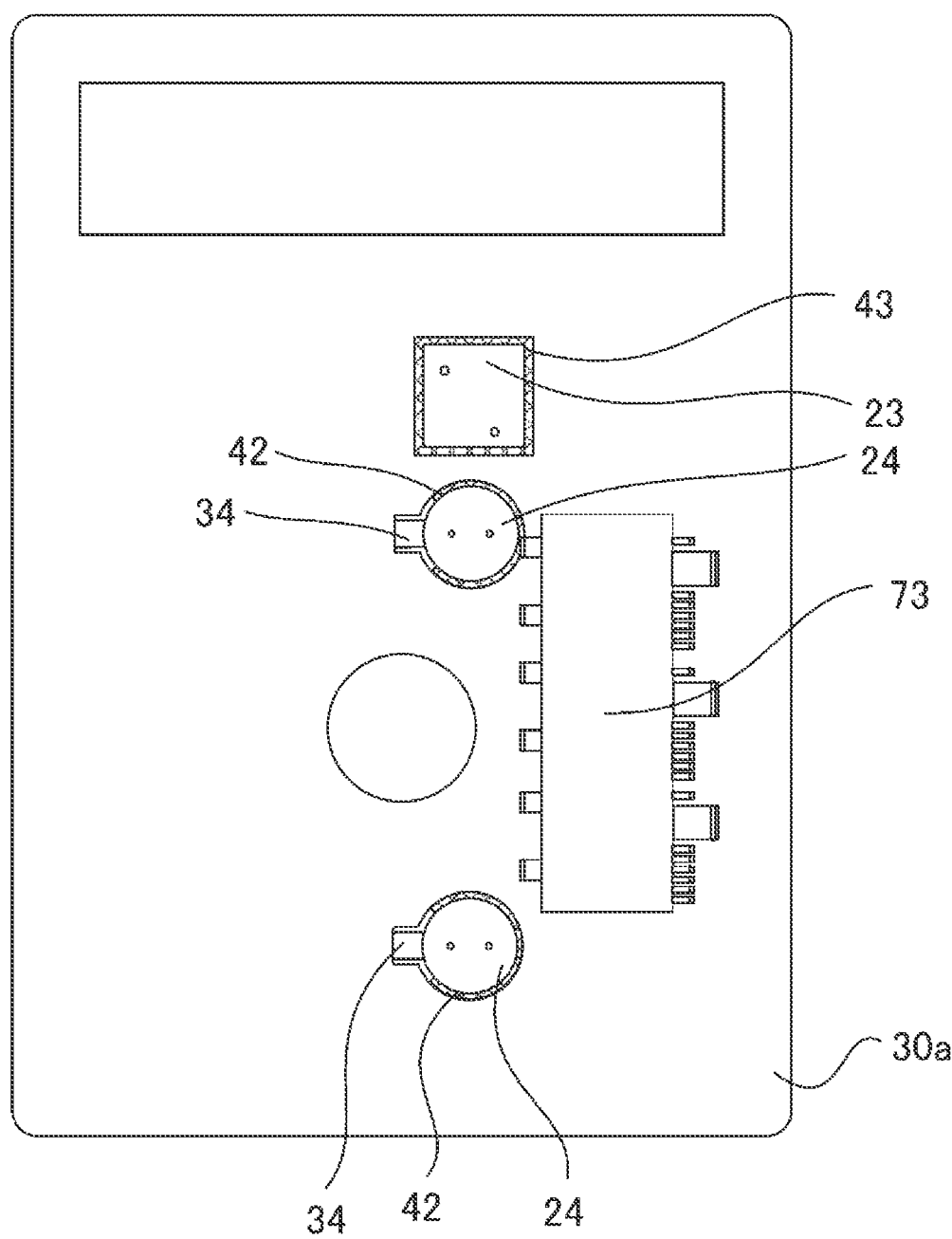
FIG. 11 is a plan view of the control unit of the rotary electric machine according to Embodiment 2 as viewed from the direction opposite to the motor.

FIG. 11 is a plan view of the control unit 2a in the rotary electric machine according to Embodiment 2 as viewed from the direction opposite to the motor 1, and the connectors 4a and 4b, the cover 5, the drive circuit board 3a, the frame 71, and the terminal 72a are not shown therein. FIG. 11 shows a state where the choke coil 23, the power module 73, and the capacitor 24 are joined to the heat sink 30a.

For the switching element heat dissipation material 40a provided between the heat sink 30a and the power module 73 including the switching elements 20a, a material that prioritizes heat dissipation is preferably used. In addition, for the capacitor heat dissipation material 42 between the capacitor 24 and the heat sink 30a and the choke coil heat dissipation material 43 between the choke coil 23 and the heat sink 30a, a material having elasticity in order to ensure vibration isolation is preferably used. Therefore, different materials are used for the switching element heat dissipation material 40a and for the capacitor heat dissipation material 42 and the choke coil heat dissipation material 43.

In the control unit 2a, the capacitor 24 is disposed near a center portion, of the control unit 2a, which is close to the rotation shaft 11, the power module 73 including the switching elements 20a is disposed in a peripheral portion, of the control unit 2a, which is far from the rotation shaft 11, and the choke coil 23 is disposed at a position close to the connectors 4a and 4b. That is, in the heat sink 30a, the capacitor housing portion 32 is located at a position closer to a center portion of the heat sink 30a than to the contact surface 36 which is in contact with the switching element heat dissipation material 40a, and the choke coil housing portion 35 is located at a position close to the connectors 4a and 4b. Accordingly, the heat dissipation performance of the heat sink 30a can be improved.

As described above, in the rotary electric machine according to Embodiment 2, the control unit 2a includes the power unit 70, the power unit 70 includes the power module 73 including the switching elements 20a, and the choke coil 23 and the capacitor 24 which are fixed via the terminal 72a, the switching elements 20a are joined to the heat sink 30a via the switching element heat dissipation material 40a, the heat sink 30a includes the recess-shaped choke coil housing portion 35 having a bottom surface joined to the upper surface of the choke coil 23 via the choke coil heat dissipation material 43, and the recess-shaped capacitor housing portion 32 having an inner peripheral side surface joined to the outer peripheral side surface of the capacitor 24 via the capacitor heat dissipation material 42, and the capacitor housing portion 32 includes the explosion-proof valve recess 33 located at a position facing the explosion-proof valve 60 of the capacitor 24, and the communication passage 34 providing communication between the drive circuit board 3a and the explosion-proof valve 60. Therefore, similar to Embodiment 1, the capacitor 24 does not explode even if heat is generated at a very high temperature in the capacitor 24.

Although the present disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 motor
2, 2a control unit
3, 3a drive circuit board
4a, 4b connector
5 cover
11 rotation shaft
12 rotor
13 stator
14 winding
15a, 15b bobbin
16 annular terminal portion
16a terminal portion
17a, 17b bearing
18 housing
19 case
20, 20a switching element
21 CPU
22 IC
23 choke coil
24 capacitor
30, 30a heat sink
31 contact surface
32 capacitor housing portion
33 explosion-proof valve recess
34 communication passage
35 choke coil housing portion
36 contact surface
40, 40a switching element heat dissipation material
41 CPU heat dissipation material
42 capacitor heat dissipation material
43 choke coil heat dissipation material
51 projection
52 screw
60 explosion-proof valve
70 power unit
71 frame
72a, 72b terminal
73 power module
74 resin
75 insulating member
100 capacitor mounting surface
200 switching element mounting surface

The invention claimed is:

1. A rotary electric machine comprising a control unit, wherein
the control unit includes a switching element, a capacitor, a choke coil, and a heat sink,
the switching element is joined to the heat sink via a switching element heat dissipation material,
the heat sink includes
a recess-shaped choke coil housing portion having a bottom surface joined to an upper surface of the choke coil via a choke coil heat dissipation material, and
a recess-shaped capacitor housing portion having an inner peripheral side surface joined to an outer peripheral side surface of the capacitor via a capacitor heat dissipation material, and
the capacitor housing portion includes
an explosion-proof valve recess located at a position facing an explosion-proof valve of the capacitor, and
a communication passage providing communication between a drive circuit board and the explosion-proof valve.

2. The rotary electric machine according to claim 1, wherein
the choke coil and the capacitor are mounted on a capacitor mounting surface, of the drive circuit board, facing the heat sink, the switching element is mounted on a switching element mounting surface on a back side of the capacitor mounting surface and joined to the heat sink via the drive circuit board, a copper material, and the switching element heat dissipation material, and the switching element heat dissipation material is made of a material different from the choke coil heat dissipation material and the capacitor heat dissipation material.

3. The rotary electric machine according to claim 2, wherein the drive circuit board is fixed to the heat sink by a plurality of screws, and the switching element is disposed outside a region surrounded by the plurality of screws, on the drive circuit board.

4. The rotary electric machine according to claim 1, wherein the capacitor housing portion is located at a position closer to a center portion of the heat sink than to a position at which the switching element heat dissipation material and the heat sink are joined to each other.

5. The rotary electric machine according to claim 1, wherein the control unit includes a CPU and a cover covering the drive circuit board, and the cover includes a projection joined to the CPU via a CPU heat dissipation material.

6. The rotary electric machine according to claim 1, wherein the control unit includes a power unit, and the power unit includes a power module including the switching element, and the choke coil and the capacitor fixed via a terminal.

7. The rotary electric machine according to claim 2, wherein the capacitor housing portion is located at a position closer to a center portion of the heat sink than to a position at which the switching element heat dissipation material and the heat sink are joined to each other.

8. The rotary electric machine according to claim 3, wherein the capacitor housing portion is located at a position closer to a center portion of the heat sink than to a position at which the switching element heat dissipation material and the heat sink are joined to each other.

9. The rotary electric machine according to claim 2, wherein the control unit includes a CPU and a cover covering the drive circuit board, and the cover includes a projection joined to the CPU via a CPU heat dissipation material.

10. The rotary electric machine according to claim 3, wherein the control unit includes a CPU and a cover covering the drive circuit board, and the cover includes a projection joined to the CPU via a CPU heat dissipation material.

11. The rotary electric machine according to claim 4, wherein the control unit includes a CPU and a cover covering the drive circuit board, and the cover includes a projection joined to the CPU via a CPU heat dissipation material.

12. The rotary electric machine according to claim 7, wherein the control unit includes a CPU and a cover covering the drive circuit board, and the cover includes a projection joined to the CPU via a CPU heat dissipation material.

13. The rotary electric machine according to claim 8, wherein the control unit includes a CPU and a cover covering the drive circuit board, and the cover includes a projection joined to the CPU via a CPU heat dissipation material.

* * * * *